United States Patent [19]
Copeland

[11] 3,832,928
[45] Sept. 3, 1974

[54] PORTABLE PULPWOOD SLASHING MACHINE
[76] Inventor: Henry W. Copeland, P.O. Box 11349, Montgomery, Ala. 36111
[22] Filed: Nov. 30, 1972
[21] Appl. No.: 310,948

[52] U.S. Cl.................... 83/467, 83/471.2, 83/928, 83/522, 83/469
[51] Int. Cl........................ B27b 5/02, B27b 27/02
[58] Field of Search ...... 83/471.2, 928, 467, 467 A, 83/468, 469, 436, 418, 419, 522

[56] References Cited
UNITED STATES PATENTS

| | | | |
|---|---|---|---|
| 2,039,017 | 4/1936 | McLeod................................ | 83/928 |
| 2,722,954 | 11/1955 | Carver et al.......................... | 83/469 |
| 2,766,783 | 10/1956 | Miller.................................... | 83/467 |
| 3,517,711 | 6/1970 | Reeser et al........................ | 83/928 X |
| 3,623,519 | 11/1971 | Radle.................................. | 83/471.2 |
| 3,688,818 | 9/1972 | Domres................................ | 83/522 |
| 3,718,060 | 2/1973 | Carlton et al....................... | 83/928 X |
| 3,718,061 | 2/1973 | Wilkin ................................ | 83/467 A |

Primary Examiner—Donald R. Schran
Attorney, Agent, or Firm—Clarence A. O'Brien; Harvey B. Jacobson

[57] ABSTRACT

A wood slashing machine specifically intended for use with a conventional loading machine has a trailable vehicle formed by a frame and a pair of wheels mounted on the frame. Portions of the frame form a bed for restricting the movement of pulpwood, saw logs, fence posts, and the like, arranged on the bed by the loading machine. A circular saw is mounted on the frame as by a four-link mechanism actuated from the loading machine for cutting of articles arranged on the bed. The length of the articles cut off may be gauged by a stop plate adjustably mounted on the slashing machine frame. The bed is advantageously arranged so that the article being cut is spaced furthest from the frame at a point adjacent the saw so as to place the area being cut in tension and facilitate sawing.

12 Claims, 8 Drawing Figures

PORTABLE PULPWOOD SLASHING MACHINE

BACKGROUND OF THE INVENTION

1. Field of the Invention

This invention relates generally to a slashing machine, and particularly, to a wood slashing machine used in conjunctin with a conventional loading machine.

2. Description of the Prior Art

In the harvesting of pulpwood, saw logs, fence posts, and other useful wood products, it is a necessary and conventional practice to fell the tree with a standard power saw or shearing mechanism, to remove the limbs and top of the felled tree with a power saw or hand axe, and to drag the felled and delimbed stem of wood by itself, or together with other such pieces, to a cleared landing or "deck" where it may be further processed. The dragging or skidding operation is performed by, for example, mules, crawler-tractors, wheeled tractors, and, most commonly, by articulated frame, rubber-tired skidder tractors.

Most pulpwood used by paper mills, and the like, is delivered to the mills by railroad cars from strategically located collection points near the harvesting site. Since maximum railway clearance width is generally 10 feet 6 inches, and the corresponding highway clearance is 8 feet, pulpwood so shipped is cut into 5 feet 3 inch lengths before being loaded onto railway cars and trailers. There is, of course, two rows of pulpwood lengths stacked on the railway cars, while only one of a roadway vehicle. The pulpwood is in fact cut into the 5 feet 3 inch lengths on the "deck" referred to above and loaded onto suitable trucks for being hauled to the railway car collection points. In some cases pulpwood is delivered directly to the mill site on a roadway vehicle. In these cases, wood is cut into 7 feet or 8 feet lengths, depending on local highway ordinances. The conventional manner of cutting these lengths is for a man with a measuring stick in one hand and a power saw in the other to move along the stems and cut them into 5 feet 3 inches, 7 feet 0 inches, 8 feet 0 inches or other suitable lengths as required.

A device proposed for replacing the aforementioned man, measuring stick, and power saw, is disclosed in U.S. Pat. No. 3,519,042. This known device employs a fork-lift attachment to a tractor, and the like. The frame of the fork-lift attachment is provided with a circular saw and a stop plate for gauging and cutting pulp poles into uniform lengths. The pulpwood is supported by the forks of the fork-lift attachment, and is grippingly retained on the forks by a suitable gripping device. Once the pulp poles have been cut, the fork-lift attachment loads them onto a suitable vehicle for transport.

SUMMARY OF THE INVENTION

It is an object of the present invention to provide a pulpwood slashing machine which is more efficient and is capable of handling greater volume than known machines of this kind.

It is another object of the present invention to provide a slashing machine specifically intended to be used with a conventional loading machine.

It is yet another object of the present invention to provide a slashing machine which may selectively gauge the length of a member to be cut with one of a plurality of predetermined values.

It is a further object of the present invention to provide a slashing machine which is portable and may be easily transported to and from a harvesting site, and may be quickly and easily converted to a stable platform at the harvesting site.

These and other objects are achieved according to the present invention by providing a slashing machine specifically intended for use with a loading machine, and constructed as a vehicle having a frame and at least one wheel mounted on the frame. Portions of the frame are arranged to form a bed for retaining the pulpwood and other articles positioned thereon by a loading machine. A circular saw and a four-link saw feeding mechanism are mounted on the frame and arranged for cutting articles retained in the bed. The four-link mechanism is advantageously actuated from the operator's platform of the associated loading machine.

Preferably, the frame is planar and the article retaining bed includes a plurality of support members arranged in planes substantially parallel to and spaced from the plane of the frame. Arms are connected to corresponding end portions of the support members, and are arranged extending from both the support members and the frame at an oblique angle for restricting movement of the articles. Advantageously, the support member adjacent the saw is spaced further from the frame than support members distant from the saw for placing the material being cut under tension and facilitating sawing.

A preferred four-link mechanism according to the present invention has a first link preferably mounted at one end on the frame, a second link pivotally mounted at a one end to the other end of the first link and connected to the saw at its other end, a third link pivotally mounted at a one end to the frame, and a fourth link pivotally connected at points arranged between the ends of the second and third links. A linear fluid motor, and the like, may be pivotally connected to and arranged between the second and third links substantially parallel to the first link for verying the relationship of the links.

An advantageous feature of the present invention has the third link biasedly attached at its other end to the frame so that the saw and four-link mechanism will overcome the bias and rise up when forced into material beyond the capacity of the saw.

A stop plate, and the like, may be mounted on the frame for engaging a length of material to be sawed off. This stop plate is advantageously adjustably mounted on the frame, and is arranged extending substantially perpendicularly from the plane of the frame. A modified embodiment of the present invention has the stop plate arranged on the frame for selectively swinging into a position permitting longer than usual lengths of wood, such as 16 foot logs, to be cut off. A linear fluid motor, and the like, may be provided for swinging the stop plate between its extended and retracted positions. The stop plate may be removed from the machine to more advantageously cut longer than usual lengths of wood.

The frame may be stabilized with respect to its supporting surface by removing the wheels at the harvesting site, by removing the wheel and axle assembly, or by digging two holes with the loading machine for the wheels to drop into allowing the frame to settle to the supporting surface. Alternatively, each wheel mounted on the frame may be rotatably mounted to a lever pivotally mounted on the frame. A further lever mounted for pivoting with the first lever, and forming a crank therewith, is actuatable for selectively pivoting the wheel mounting lever and swinging the associated wheel between a supporting-surface engaging position and a wheel retracted position.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
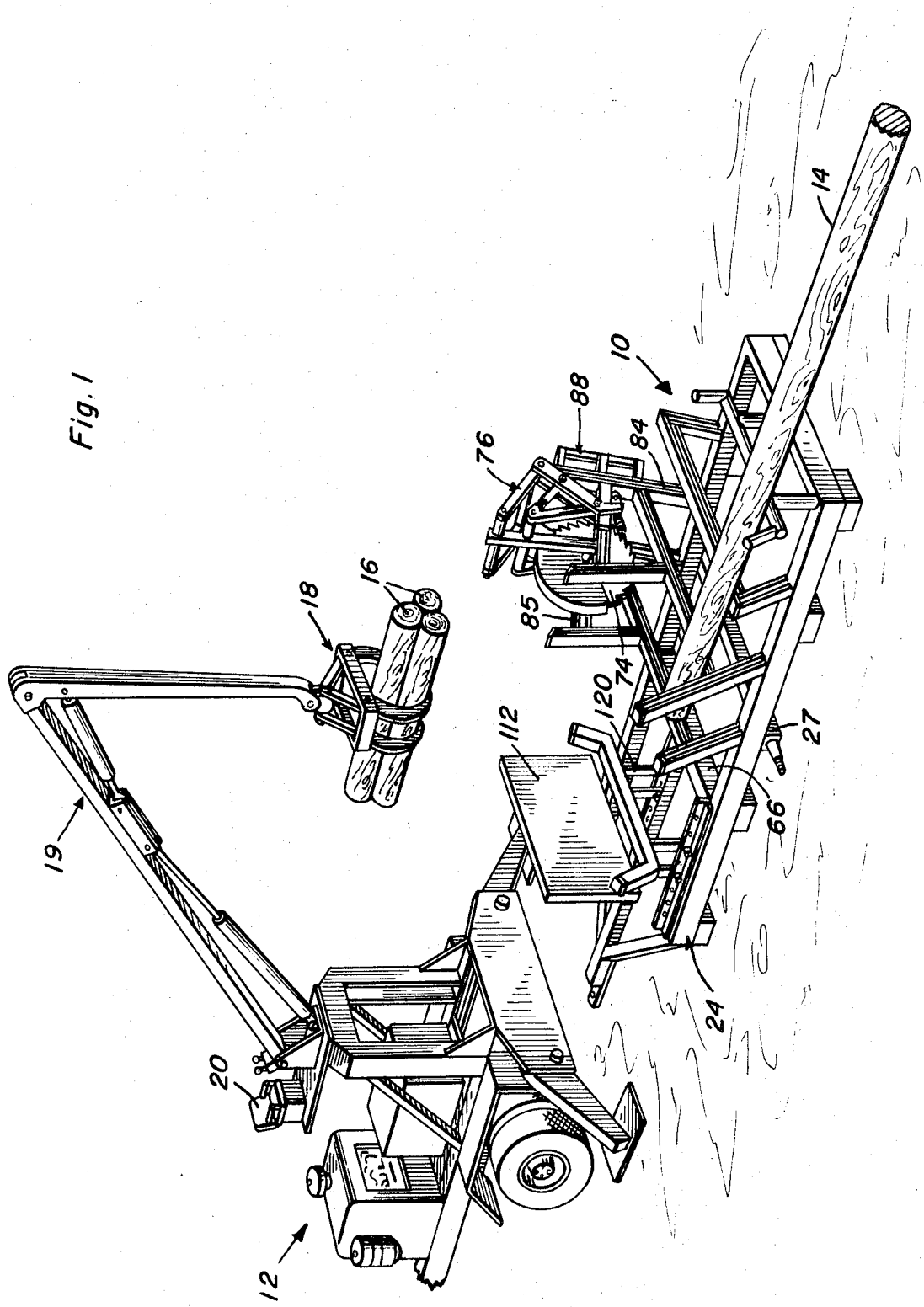
FIG. 1 is a fragmentary, perspective view showing a slashing machine according to the present invention operably positioned adjacent a conventional loading machine.

FIG. 1 of the drawings shows a slashing machine 10 according to the present invention and a conventional loading machine 12 arranged for moving pulpwood, logs, and the like, 14 into and out of machine 10. A plurality of cut members or bolts 16 are shown engaged by a conventional grapple 18 attached to the boom 19 of loading machine 12. A standard, articulated boom, hydraulically powered loading machine is illustrated for loading the machine 12. The entire slashing operation — that is, the operation of both slashing machine 10 and loading machine 12 — may be controlled by a single operator (not shown) from an operator seat 20 of loading machine 12. Equipment may be easily provided on such loading machines for furnishing, for example, hydraulic operating fluid under pressure.

Figure 2:
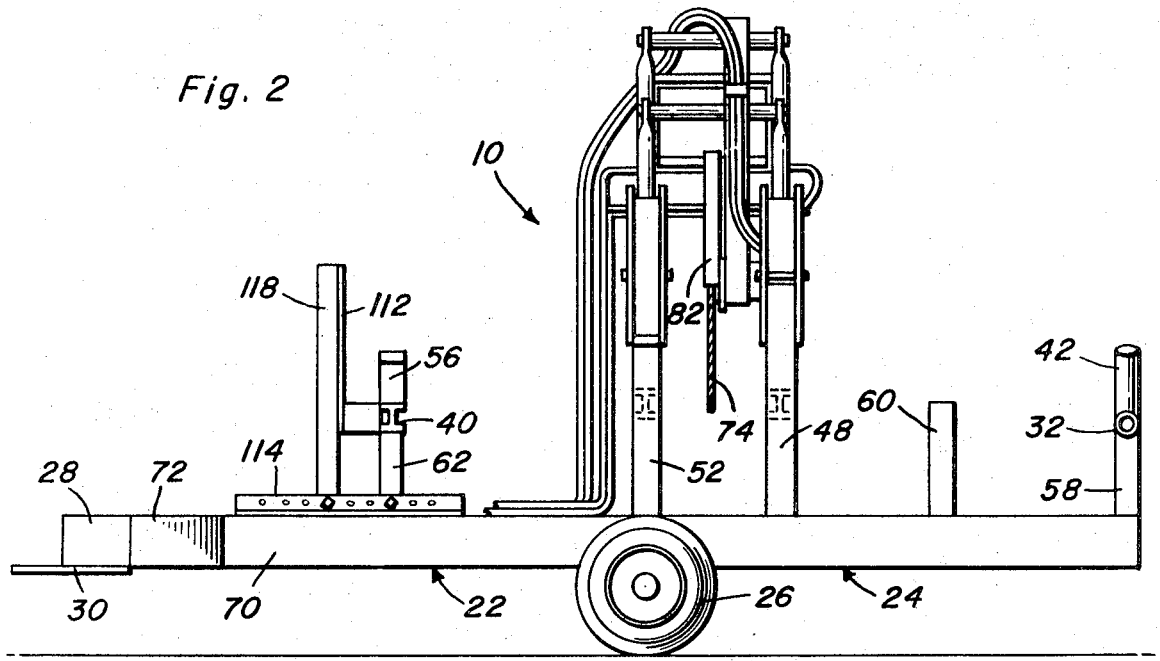
FIG. 2 is a side elevational view showing the loading machine of FIG. 1.
Figure 3:
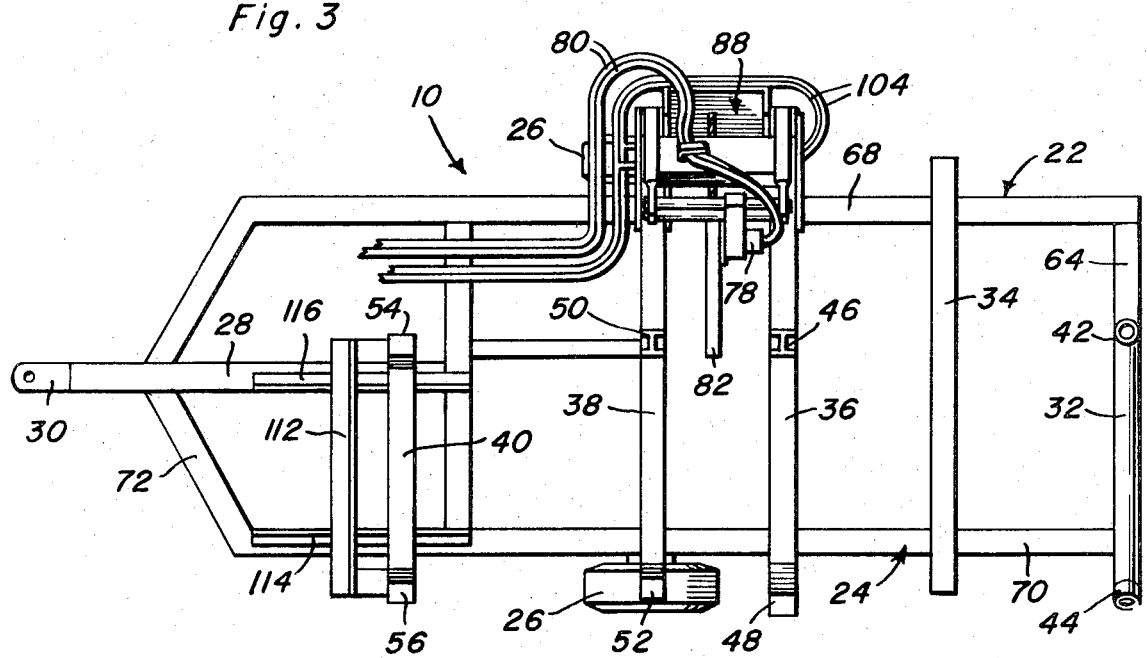
FIG. 3 is a top plan view showing the loading machine of FIGS. 1 and 2.

As can best be seen from FIGS. 2 and 3 of the drawings, slashing machine 10 is constructed as a vehicle 22 having a frame 24 and a pair of wheels 26 mounted on an axle 27 (FIG. 1) affixed to frame 24. Frame 24 also has a tongue 28 terminating in a plate 30 for forming a conventional hitch permitting vehicle 22 to be tailored from one site to another.

A plurality of support members 32, 34, 36, 38, and 40 are arranged in planes spaced from and parallel to the plane of planar frame 24 for forming a bed retaining articles 14 positioned thereon by loading machine 12. Arms 42, 44, 46, 48, 50, 52, 54, and 56 are connected to end portions of the support members, and are arranged extending from the support members and frame 24 at an oblique angle for restricting movement of articles 14. Upright supports, among them supports 58, 60, and 62, support the support members in spaced relation from frame 24. Support members 36, 38 arranged adjacent the circular saw, to be described below, are spaced further from frame 24 than the more distant support members so as to place articles 14 under tension in the area to be cut and facilitating the cutting. Also, this feature facilitates dropping of the sawed pieces away from the blade as they are severed. Frame 24 is formed by a plurality of cross rails, rails 64 and 66 (FIG. 1) being shown, connecting together a pair of side rails 68 and 70. A V-brace 72 extends from rails 68, 70 to tongue 28 to complete frame 24.

Figure 4:
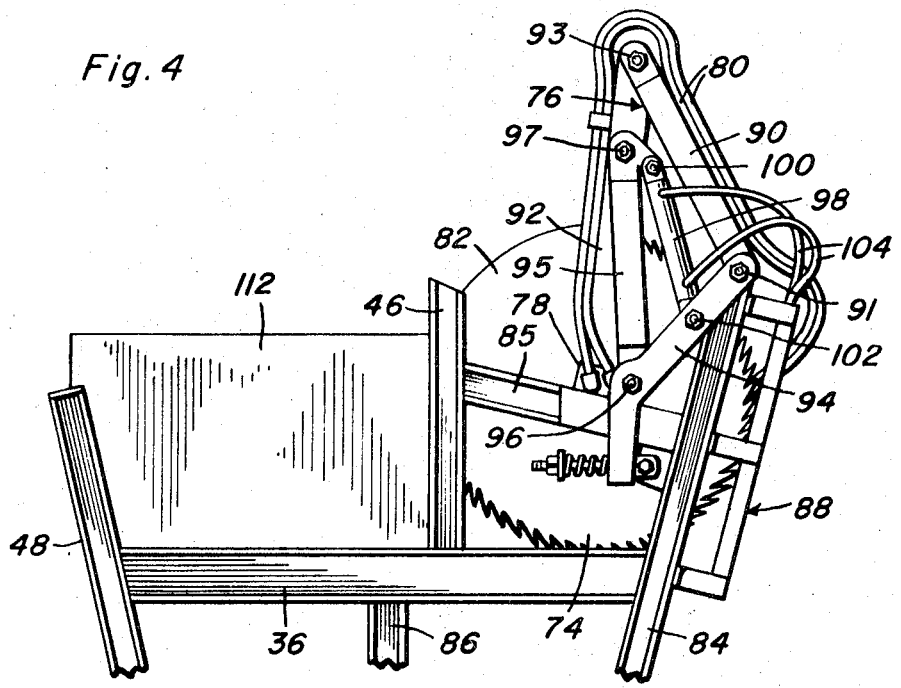
FIG. 4 is a fragmentary, end elevational view, showing the cutting arrangement of the slashing machine of FIGS. 1 to 3.
Figure 5:
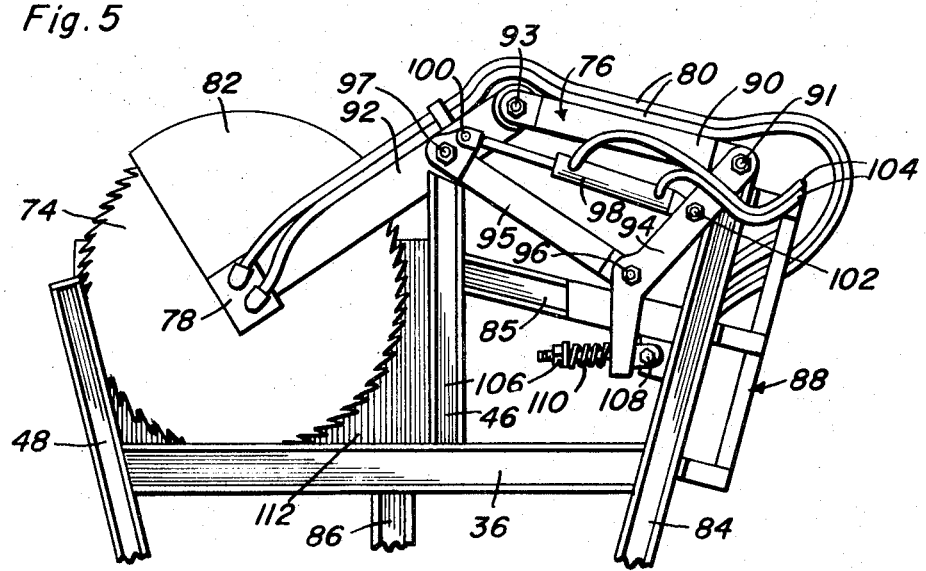
FIG. 5 is a fragmentary, end elevational view, similar to FIG. 4 but showing the parts in a moved position.

A conventional circular saw 74 is movably mounted on frame 24 as by a four-link mechanism 76. As illustrated, saw 74 is rotated by, for example, a hydraulic motor 78 with a fluid received through hoses 80 running to loading machine 12. Alternatively, the power source for saw 74 can be self-contained on slashing machine 10. Further, it is to be understood that electric motors and other suitable, known power sources may be used in place of the hydraulic system. A blade guard 82 may be arranged about a portion of saw 74 in a conventional manner for safety reasons. A pair of braces 84 and 85 are attached to ends of support members 36 and 38 opposite from the ends associated with arms 48 and 52. Braces 85 extend between braces 84 and arms 46, 50. An upright support 86 visible in FIGS. 4 and 5 cooperates with support 62 for supporting an I-beam which forms supporting member 40. A screen arrangement 88 may extend between braces 84 for providing a further safety feature.

Four-link mechanism 76 is constructed from longitudinally extending links having a pair of spaced ends. A first of these links 90 is pivotally mounted at a one of its ends on braces 84 as by pins 91. A second link 92 is pivotally mounted also at a one end to the other end of the links 90 as by a pin 92 and suitable spacers, and is connected at its other end to a shaft which mounts saw 74 for rotation. A third link 94, which functions as a control arm for mechanism 76, is pivotally mounted on braces 84 as also by one of pins 91, and a fourth link 95 is pivotally connected at points arranged between the ends of links 92 and 94 as by pins 96 and 97. A linear fluid motor 98 of conventional construction may be pivotally connected to and arranged between links 92 and 94 as by pins 100 and 102. Hoses 104 connect motor 98 to loading machine 12. Alternatively, the power source for motor 98 may be arranged on slashing machine 10, as discussed above for motor 78.

The control arm formed by link 94 is biasedly attached at its other end to frame 24, as by a pin 106 engaging a plate 108 affixed to a brace 84 and a cross brace 85. A convention compression spring 110 is arranged on the shank of pin 106 for providing the bias. In this manner, saw 74 and mechanism 76 will overcome the bias of spring 110 and rise up when forced into material beyond the capacity of the structure. Further, the bias will compensate for wear to saw 74.

A stop plate 112 is mounted on frame 24 for gauging a length of material to be cut off articles 14. That is, it gauges the length of a bolt 16. A planar member, such as illustrated, is preferred. This stop plate 112 is advantageously adjustably mounted on frame 24 as by perforated rails 114, 116 and braces 118, 120. Supporting member 56 and its supporting structure may form a unit with plate 112 and its supporting structure, as is illustrated in FIGS. 1 to 3. Conventional bolts, and the like, may be used to adjustably mount braces 118, 120 in selected perforations or holes provided in rails 114, 116.

Figure 6:
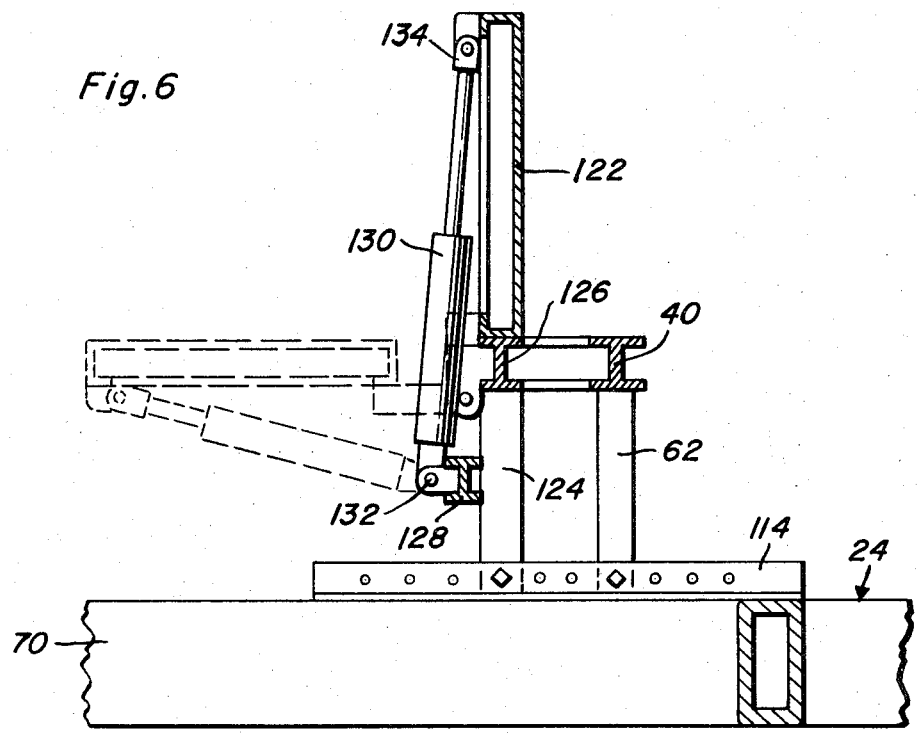
FIG. 6 is a fragmentary, vertical, longitudinal sectional view showing a modified stop plate according to the present invention.

FIG. 6 shows a modified embodiment of the present invention in which a stop plate 122 is mounted on upright supports 124 by means of an I-beam 126. An I-beam 128 is also connected across braces 124 (only one of which is shown in FIG. 6) substantially midway between the end portions thereof. A conventional linear fluid motor 130 is pivotally connected to and arranged between I-beam 128 and the free end of plate 122 as by pins 132 and 134 for swinging plate 122 between an extended position as shown in full lines in FIG. 6 and a retracted position as shown in broken lines. The retracted position permits articles 14, such as logs, to be cut for eventually being sawed into lumber whenever the diameter of the tree trunk permits. Motor 113 may be actuated from a power source either on loading machine 12 or on slashing machine 10, as desired, by means of conventional hoses (not shown). Plate 122 may be hinged to I-beam 126 in a conventional manner not shown in detail in FIG. 6.

Figure 7:
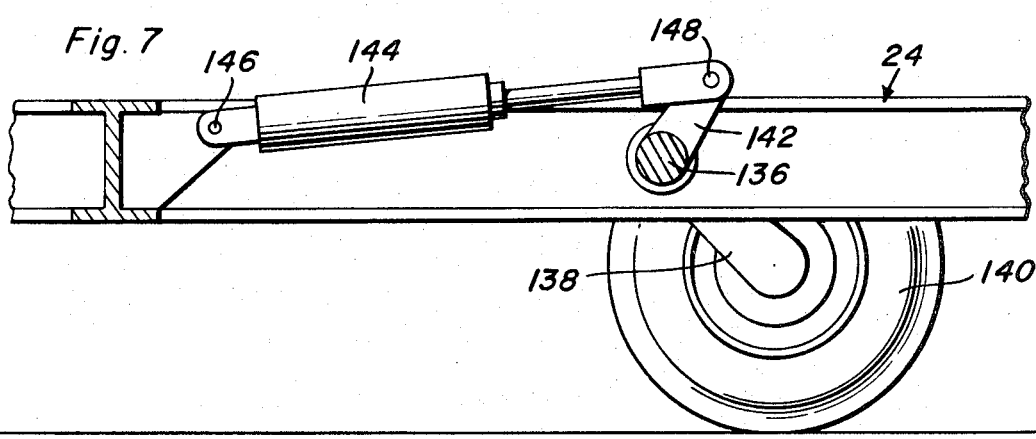
FIG. 7 is a fragmentary, vertical, longitudinal sectional view showing a retractable wheel arrangement of a modified embodiment of the present invention.
Figure 8:
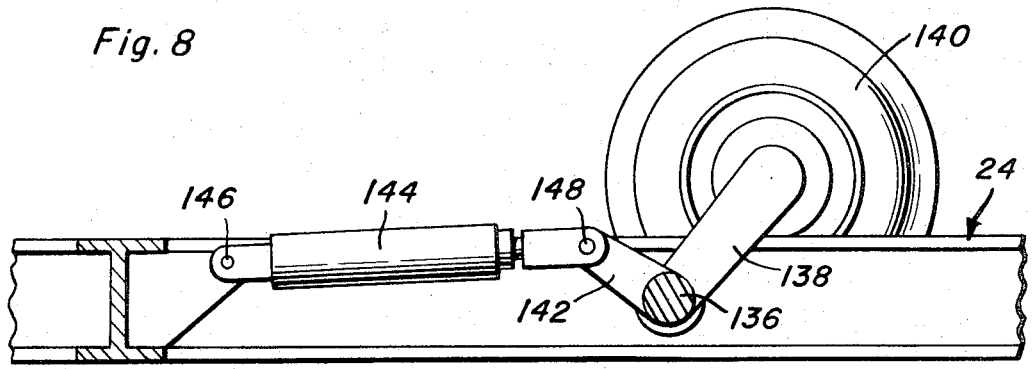
FIG. 8 is a fragmentary, vertical, longitudinal sectional view similar to FIG. 7, but showing the parts in a moved position.

Referring now to FIGS. 7 and 8 of the drawings, a modified embodiment of the present invention is shown which has a shaft 136 pivotally mounted on frame 24 in a conventional, known manner. A lever 138 is mounted on shaft 136 for pivotal movement therewith, and a wheel 140 is rotatably mounted on lever 138 in a conventional manner. A further lever 142 is mounted on shaft 136 also for pivoting therewith and with lever 138, levers 138 and 142 cooperating to form a crank. A conventional linear fluid motor 144 is pivotally connected to frame 24 as by a pin 146 and to the free end of lever 142 as by a pin 148. Motor 144 may be actuated in a manner as for that set out for the other fluid motors discussed above, and will pivot lever 138 and swing wheel 140 between a supporting surface engaging wheel position as illustrated in FIG. 7 and a wheel retracted position as illustrated in FIG. 8. A pair of wheels 140 may be so arranged on frame 24. In this manner, frame 24 can be stabilized on its supporting surface, such as the ground, without the necessity of removing wheels.

As can be readily understood from the drawings and the above description, slashing machine 10 may be trailered to a harvesting site and either its wheels 26 removed, the wheel and axle assembly removed, or its wheels 140 retracted. Likewise holes may be dug by the loading machine 12 to accept the wheels and allow the supporting surface to bear against the frame members. The loading machine 12 may be connected to the various motors provided on slashing machine 10, and an operator (not shown) setting in operator seat 20 of loading machine 12 can place articles 14 to be cut onto the bed of slashing machine 10. Stop members 112, 122 may be used to gauge the length of a bolt 16 to be cut from the articles 14. The operator, still stationed in seat 20, may now be actuate saw 74 and mechanism 76 to cut, or slash, the material. Suitable known kinds of manually or electrically actuated hydraulic control systems may be used for controlling slasher 10 from operator seat 20. Loading machine 12 may now remove the cut bolts 16 by engaging same with its grapple 18, and then, in a conventional manner (not shown), engage articles 14 and reposition same on the bed of slashing machine 10 and repeat the above cycle. Once harvesting is finished, wheels 26 or wheel and axle assembly may be either replaced on slashing machine 10 or wheels 140 extended into their FIG. 7 position and the slashing machine trailered to another harvesting site or to storage. This arrangement permits large quantities of pulpwood, and the like, to be quickly and efficiently cut to proper lengths. In the event the operator places pulpwood, comprising articles 14, onto the bed of slashing machine 10 whose individual diameter or combination of diameters is a greater height above the supporting members than the distance from the supporting members to the hub, or shaft, of saw 74, the bias of spring 110 will be overcome and saw 74 will ride above the logs and will not be damaged. Loading machine 12 may place the bolts 16 into a conventional truck (not shown) or other hauling device to be transported in a conventional manner.

THe foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A slashing machine, comprising, in combination:

a. a frame;
   b. means mounted on the frame for making same mobile;
   c. mean on the frame for retaining articles;
   d. means mounted on the frame for cutting articles retained by the retaining means, the cutting means including a saw, and means for movably mounting the saw on the frame, the saw mounting means including a four-link mechanism constructed from links having a pair of spaced ends, a first link of these links being pivotally mounted at a one end on the frame, a second link pivotally mounted at a one end to the other end of the first link and connected to the saw at the other end, a third link pivotally mounted at a one end to the frame, the first and third links being pivotally mounted on the frame at a common point, and a fourth link pivotally connected at a point arranged between the ends of the second link and to the third link; and
   e. means mounted on the frame for gauging a length of material to be cut off, the length gauging means including a stop member pivotally mounted on the frame transversely with respect to the length of an article to be cut, and arranged for selectively swinging into a position permitting longer than usual lengths of wood to be cut off, the structure further including means for swinging the stop member.

2. A slashing machine, comprising, in combination:

a. a frame;
   b. means mounted on the frame for making same mobile;
   c. means on the frame for retaining articles; and d. means mounted on the frame for cutting articles retained by the retaining means, the cutting means including a saw, and means for movably mounting the saw on the frame, the saw mounting means including a four-link mechanism constructed from links each having a pair of spaced ends, a first link of these links being pivotally mounted at a one end of the frame, a second link pivotally mounted at a one end to the other end of the first link and connected to the saw at the other end, a third link pivotally mounted at a one end to the frame, the first and third links being pivotally mounted on the frame at a common point, and a fourth link pivotally connected to a point arranged between the ends of the second link and to the third link, the third link being a control arm biasedly attached to the frame and arranged for the four-link mechanism to overcome the bias on the third link and pivot about the common point away from an article being cut when the saw is forced into material beyond the capacity thereof.

3. A structure as defined in claim 2, wherein the fourth link is pivotally connected to the third link between the ends thereof, and a pin mounted on the frame and having a shank, a compression spring is arranged on the shank of the pin abutting an end of the third link spaced from the common point for biasing the abutted link end toward the frame.

4. A structure as defined in claim 3, further including a linear fluid motor pivotally connected to and arranged between the second and third links and substantially parallel to the first link, for varying the relationship of the links.

5. A structure as defined in claim 4, wherein the frame is planar and the article retaining means includes a support member arranged in a plane spaced from and parallel to the plane of the frame, and arms connected to end portions of the support members and arranged extending from the support members and frame at an oblique angle for restricting movement of the articles.

6. A structure as defined in claim 5, wherein there is a plurality of parallel support members, and a support member adjacent the article cutting means is spaced further from the frame than support members distant from the article cutting means for placing the material being cut under tension and facilitating cutting.

7. A structure as defined in claim 1, wherein the third link is a control arm biasedly attached to the frame and arranged for the four-link mechanism to overcome the bias and pivot about the common point away from an article being cut when the saw is forced into material beyond the capacity thereof.

8. A structure as defined in laim 6, further including means mounted on the frame for gauging a length of material to be sawed off.

9. A structure as defined in claim 8, wherein the length gauging means includes a planar stop member adjustably mounted on the frame and arranged extending substantially perpendicularly from the plane of the frame.

10. A structure as defined in claim 1, wherein the stop member is pivotally mounted on a part of the frame and arranged for selectively swinging into a position parallel to the plane of the frame and permitting longer than usual lengths to be cut off, the structure further including a linear fluid motor pivotally mounted to and arranged extending between a frame portion and the stop member for swinging same.

11. A strucutre as defined in claim 10, wherein the mobile frame making means includes a lever pivotally mounted on the frame, a wheel rotatably mounted on the lever, and means for selectively pivoting the lever between a supporting-surface engaging wheel position and a wheel retracted position.

12. A structure as defined in claim 7, wherein the mobile frame making means is at least one selectively attachable wheel.

* * * * *